United States Patent [19]

Koeller

[11] 4,089,617
[45] May 16, 1978

[54] DISTRIBUTOR FOR TURBO HYDRAULIC MACHINES

[75] Inventor: Paul Koeller, Dorval, Canada

[73] Assignee: Dominion Engineering Works Limited, Lachine, Canada

[21] Appl. No.: 718,148

[22] Filed: Aug. 26, 1976

[30] Foreign Application Priority Data

Sep. 3, 1975 Canada .................................. 234727

[51] Int. Cl.² ........................ F01B 25/10; F01D 9/00; F01D 17/16; F03B 3/18
[52] U.S. Cl. .................................. 415/163; 415/184; 415/191
[58] Field of Search ............... 415/163, 210, 184, 185, 415/191, 164, 205, 204, 155

[56] References Cited

U.S. PATENT DOCUMENTS

| 1,451,263 | 4/1923 | Kaplan | 415/163 |
| 1,656,006 | 1/1928 | Lieber | 415/163 |
| 1,803,220 | 4/1931 | Thompson | 415/163 |
| 2,803,428 | 8/1957 | Garnett | 415/185 X |
| 2,972,469 | 2/1961 | Mayo, Jr. | 415/163 |
| 3,081,975 | 3/1963 | Sproule et al. | 415/163 UX |
| 3,186,685 | 6/1965 | Chatfield et al. | 415/184 X |

FOREIGN PATENT DOCUMENTS

| 52,003 | 6/1911 | Switzerland | 415/164 |
| 21,653 of | 1909 | United Kingdom | 415/163 |

Primary Examiner—Carlton R. Croyle
Assistant Examiner—Donald S. Holland
Attorney, Agent, or Firm—Raymond A. Eckersley

[57] ABSTRACT

A turbo-machine such as a hydraulic turbine and/or pump-turbine is provided with a combined scroll case distributor wherein the customary stay ring of the scroll case is dispensed with and the distributor integrated with the scroll case, the edges of the distributor that define the distributor slot being held in spaced relation by a series of bolts, on which may be mounted the wicket gates of the machine. The arrangement results in a marked reduction in size and weight of the scroll case components, with potential benefit in the characteristic form of the machine performance.

10 Claims, 5 Drawing Figures

U.S. Patent  May 16, 1978  4,089,617
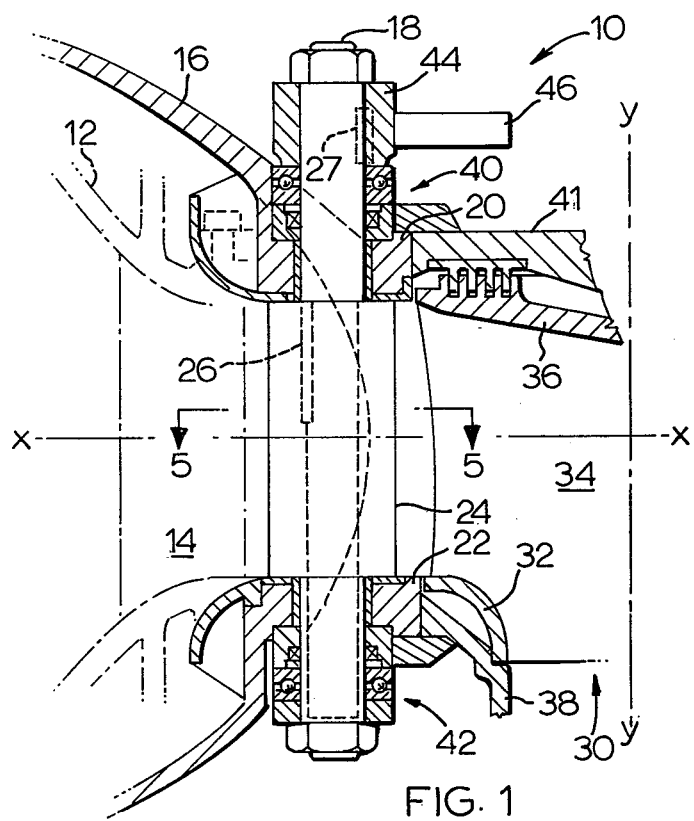
FIG. 1
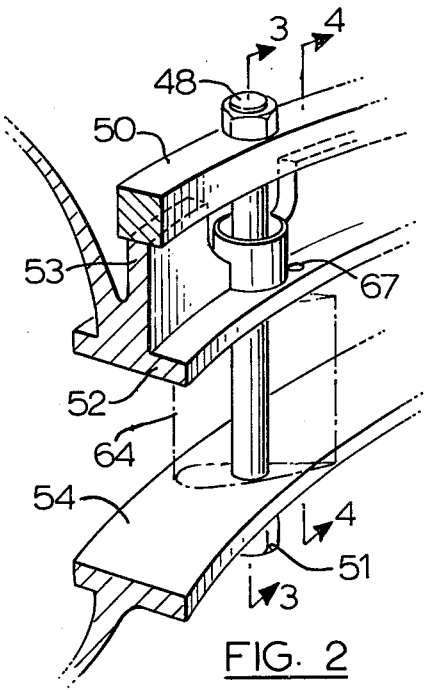
FIG. 2
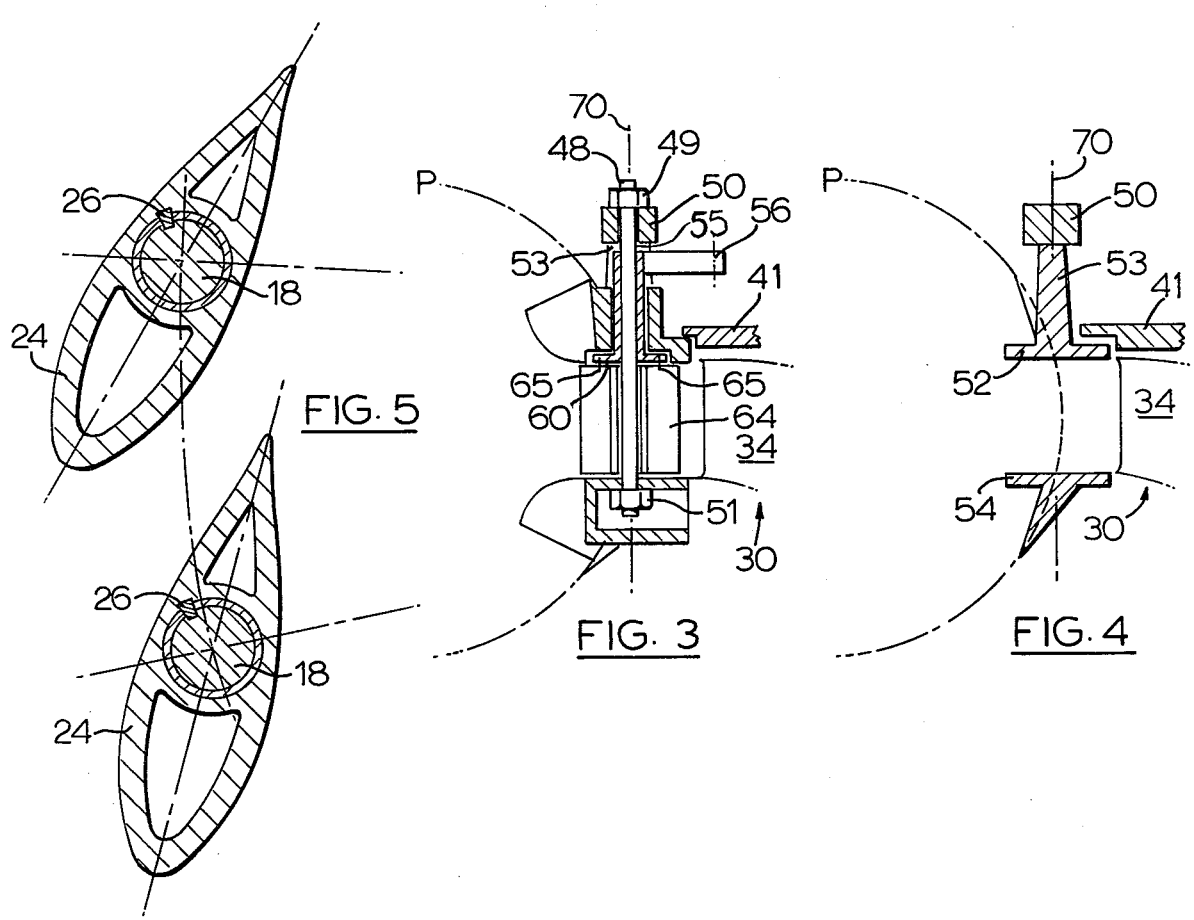
FIG. 5
FIG. 3
FIG. 4

DISTRIBUTOR FOR TURBO HYDRAULIC MACHINES

BACKGROUND OF THE INVENTION

This invention is directed to a turbo-machine and in particular to the provision of an integrated scroll case distributor for use with machines of the type including pump-turbines.

In previous arrangements of conventional reaction type turbines and pump-turbines the volute shaped scroll casings have been provided with an internal stay ring comprising an annular array of guide vanes for the purpose of maintaining the sectional shape and integrity of the scroll, and to direct the passage of liquid in relation to the slot-like opening of the distributor to which the scroll casing connects. In some instances these guide vanes have been arranged in the stay ring of the scroll case in such a manner as to place certain portions of the vanes under high tension, while other portions of the vanes have been under compression.

In the type of improved design, as shown in Canadian Pat. No. 882,490 issued Oct. 5, 1971, Piguet, the points of attachment to the scroll case are made at the centers of the stay vanes, so as to substantially uniformly stress the full cross-section of the vanes in tension. Thus, is existing turbo-machines it has been general practice to provide the scroll casing with a stay ring, to provide constraint by its vane members acting in tension so as to withstand the opening force exerted by hydraulic pressure, which tends to deform the scroll casing so as to enlarge it, tending thus to spread its edges apart.

The adjoining structure, the distributor, to which the scroll casing is attached in the prior art, provides a flow mouth, connecting with the runner of the machine, and having the wicket gates located between the opposed lips of the distributor. Lindquist, Canadian Pat. No. 726,482 issued Jan. 26, 1966, utilizes the wicket gates to absorb hydraulic defomation forces acting on the distributor.

The present invention combines the structure of the distributor as an integral part of the scroll casing, thus providing a scroll casing having a distributor portion integrally combined therewith, having a single series of stay members in the casing, wherein the integrated components of the distributor are adapted to provide a tensile or tying function to the structure of the scroll casing. A sleeve around each of the tying members can transmit compressive forces from the generator if so desired.

In accordance with the present invention the scroll stay ring is dispensed with, the distributor is structurally combined with the scroll casing and the requisite holding tensile force necessary to maintain the form of the scroll and the slot-like passage of the distributor at its predetermined opening is provided by tensile bolts. These bolts may be pretensioned and also may be used as the pivots on which the wicket gates are mounted. Pretensioning is accomplished in one instance by use of a compression sleeve about each bolt, against which the scroll case is compressed by the tensile load of the bolt.

By providing a volute casing have an upper distributor ring and a lower distributor ring each concentric with the polar axis of the machine and secured to the respective edges of the scroll case, the two rings provide by their opposed faces a pair of radially inwardly extending lips defining the mouth of the flow slot. The load-bearing tension members, such as bolts, extending between the two rings, are spaced around the volute, each transferring tensile load from the bolt to the scroll by way of the distributor ring portion of the scroll casing, while permitting the removal of individual ones of the bolts, at shut-down.

In the case of pump-turbines, having adjustable wicket gates, the bolts may be located as the pivot for the wicket gates, the gates being suitably modified in cross-sectional profile to accommodate the larger diameter pivot. In such an instance one solution is for the tie bolts to be connected in compressive relation with the slot lips by way of thrust bearings, somewhat in the fashion adopted by Lindquist, above, in his distributor. This permits pivotal rotation of the bolts while maintaining a tying force against the casing lips, to prevent opening up under the effects of hydraulic pressure acting against the casing.

An alternative arrangement of the tensioned load-bearing tie members utilizes an extended tie bolt having a bridging piece supported on external lug portions of the scroll lips, to transfer the load from the tie bolt to the scroll casing, while permitting use of a substantially unstressed wicket gate, thereby obviating the need of heavy duty thrust bearings to transfer load between the wicket gate and the scroll lips. This also utilizes the tie bolt in non-rotative relations, as a stationary or "dead" axle for the wicket gates.

The present invention may be incorporated into high head or low head machines, resulting in more compact, lighter machine structure, while elimination of the stay vanes can be used to modify the machine efficiency characteristic to a more desirable, less peaky characteristic providing a broader load range of high efficiency performance.

Preliminary calculations give indication that a saving in weight due to adopting the improved arrangement can amount to about 26% of the estimated total turbine weight, while a decrease in scroll outside diameter in the order of 5–6% can typically reduce the ratio of scroll diameter to throat diameter (draft tube width) from a value of 3.44 to a value of 3.3, approximating to a 4% reduction in ratio.

A further advantage of the present invention is the significantly diminished space requirements which can be of particular value in some projects.

SUMMARY OF THE INVENTION

The present invention thus provides, for use with a turbo-machine such as a turbine and/or pump-turbine, an annular volute-shaped scroll casing providing a liquid flow path of progressively changing section to receive in use a runner in mounted relation in the center of the scroll, with the main axis of the runner extending normally to the plane of the volute, the cross-sectional shapes of the volute normal to the plane thereof having a substantially arcuate wall terminating at an unobstructed mouth slot extending as an annulus, section, and a plurality of rod-like tie members arranged in mutually spaced relation about the periphery of the mouth extending across the mouth in tying relation therewith, the tie members each subtending an arc of a respective pitch circle of the volute section. Each of the subtended arcs is located between the upper and lower distributor lips of the scroll casing.

The present invention further provides in the above described volute a plurality of wicket gates mounted on respective ones of the tie members for pivotal positioning about the longitudinal axis of the respective member.

It will be understood that the advantages afforded by improved distributors according to the present invention apply both to the radial flow style machine, wherein the mouth slot faces radially inwardly, to provide substantially radial flow, and to the semi-axial flow style machine, wherein the mouth slot is inclined from the plane of the distributor volute to provide semi-axial flow.

BRIEF DESCRIPTION OF THE DRAWINGS

Certain embodiments of the invention are described reference being made to the accompanying drawings, wherein:

FIG. 1 is a portion of a diametrical sectional elevation of a turbo machine incorporating a first embodiment of the present invention;

FIG. 2 shows a schematic general view of a portion of the length of a second embodiment of the distributor according to the present invention;

FIG. 3 is a section at 3—3 of FIG. 2,

FIG. 4 is a section at 4—4 of FIG. 2, and

FIG. 5 is a partial sectional plan view taken at 5—5 of FIG. 1.

DESCRIPTION OF THE PREFERRED EMBODIMENTS

Referring first to the embodiment illustrated in FIGS. 1 and 5, in FIG. 1 the arrangement shows portions of a first embodiment of the invention having a scroll casing 10 with a median plane X—X, and a runner 30 rotatably mounted within the annulus formed by the scroll, the polar axis of the runner, which constitutes its axis of rotation being represented by the longitudinal axis Y—Y (displaced).

For purposes of contrast with the prior art a superimposed portion 12 of a scroll casing according to the prior art is shown in phantom, including a guide vane 14 thereof. The significant difference in arrangement of the two casings is apparent, with a marked radial drawing-in of the improved casing relative to the machine axis Y—Y resulting in a significant reduction in the lateral outside diameter of the scroll. Thus in the case of an improved casing, while having substantially the same cross-sectional areas at comparative points around the scroll as a scroll according to the prior art, the pitch circle in the plane X—X of the improved scroll will be substantially smaller. This reduces the mass of the scroll and also its major dimension, to facilitate shipment.

The first embodiment, in FIGS. 1 and 5, has a casing 16 with so-called "live" bolts 18 supported in thrust bearings 40, 42 to supply a tying load between the respective upper distributor lip 20 and the lower lip 22. The lips 20, 22 are integrally welded or bolted and form a part of the structure of the scroll casing. Wicket gates 24 located between lips 20, 22 are secured by keys 26 to the respective bolts 18. A crank 46 having a boss portion 44 secured by key 27 (shown in plantom) in keyed relation with the bolt 18 serves to rotatably position the bolt 18 and its associated wicket gate 24, to a desired position.

FIG. 1 additionally illustrates in part the usual machine elements such as runner 30 having lower band 32, upper shroud 36, blades 34 (one shown) extending therebetween, a portion of the draft tube 38, and a portion of the head cover 41, as is well known in the art.

The second embodiment, illustrated in FIGS. 2, 3 and 4 utilizes a "dead" bolt 48 and a bridging segment 50 carried on lug extension portions 53 from the top lip 52. Nuts 49, 51 carry a selected tension load to the bolt 48, to hold top lip 52 in spaced relation with bottom lip 54. The use is contemplated of a hydraulic piston and cylinder servo-motor combined with each of the nuts 49 or 51 to permit the application of hydraulic loading so as to vary the loading on the bolts 48 and permit control of the leakage at the top and bottom of the respective wicket gate by control of the clearance between the gate 64 and the lips 52, 54.

A torque sleeve 55 is shown in FIG. 3, having been omitted from FIG. 2 for purposes of clarity. The sleeve 55 connects a crank 56 to the respective wicket gate 64 by means of a flange 60 and two or more pins 65. The provision of one or more plugged bores 67 with which the pins 65 can be selectively aligned permits withdrawal or insertion of the pins 65. This makes possible the removal or replacement of individual wicket gates by upward withdrawal of the respective bolt 48 on removal of the lower nut 51, followed by removal of the pins 65, thus permitting the respective gate 64 to be removed laterally from between the lips 52, 54. The gate 64 can then be readily removed through the scroll case.

For purposes of safety the plugged bores 67 are arranged to be in alignment with pins 65 for a position of the gate 64 corresponding to a gate opening in excess of the maximum provided by the wicket gate servo-motor. This prevents accidental displacement of pins 65 during operation of the machine.

Making particular reference to the preferred geometry of the improved casing the pitch circle P, shown chain dotted, is arranged to intersect in substantial coincidence with the axis 70 of the bolts 48. It will be understood that some deviation from this ideal arrangement may be acceptable without departing from the spirit of the present invention.

What I claim as new and desire to secure by Letters Patent of the United States is:

1. An annular volute-shaped scroll vessel for use with a turbo-machine selected from a turbine and pump-turbine, to provide a flow path of progressively changing section for use with pressurized liquid, to receive a machine runner in mounted relation in the center of the volute, with the runner main axis extending substantially normally to the plane of the volute, the cross-sectional shapes of the volute normal to the plane thereof having a fixed substantially arcuate wall terminating at an unobstructed mouth slot extending as an annulus, a plurality of rod-like tension tie members arranged in mutually spaced relation about the periphery of the mouth extending across the mouth in tensile tying relation therewith, each tie member subtending an arc of a respective pitch circle of the volute section, and a plurality of wicket gates located in mutually spaced relation around said slot, being mounted on respective ones of said tie members for pivotal positioning about the longitudinal axis of the gate.

2. The scroll vessel according to claim 1 wherein said mouth slot is substantially coplanar with said plane of said volute.

3. The scroll vessel according to claim 1 wherein said mouth slot is inclined from said plane of said volute.

4. The volute as claimed in claim 1, said tie members being pivotally mounted, to support said wicket gates for said pivotal positioning.

5. The volute as claimed in claim 1, said tie members comprising tie bolt means having said wicket gates pivotally mounted in coaxial supported relation thereon.

6. The volute as claimed in claim 5 wherein said tie bolt means includes selectively variable hydraulic loading means, to permit control of the width of said mouth.

7. The volute as claimed in claim 6, including bridging segment means to permit disassembly of selected individual said tie members and the associated with wicket gate.

8. The volute as claimed in claim 1, including an upper distributor ring and a lower distributor ring secured to said volute in respective load transfer relation therewith, said tie members comprising bolts connecting said distributor rings, including nut means mountable thereon in load transfer relation to secure said rings is predetermined load transfer relation, having said wicket gates in pivotally mounted relation on said bolts.

9. The volute as claimed in claim 8 in combination with a runner rotatably mounted in coaxial relation therewith.

10. The volute as claimed in claim 1 wherein said tie members are arranged substantially normally to the plane of said volute.

* * * * *